United States Patent [19]
Dick

[11] 3,781,669
[45] Dec. 25, 1973

[54] SYSTEM FOR MEASURING AMPLITUDE AND PHASE DISTORTION

[75] Inventor: Rudolf Dick, Eningen, Germany

[73] Assignee: Wandel u. Goltermann, Eningen, Germany

[22] Filed: Oct. 19, 1972

[21] Appl. No.: 298,829

[30] Foreign Application Priority Data
Oct. 19, 1971 Germany.................. P 21 51 981.3

[52] U.S. Cl............................................. 324/57 R
[51] Int. Cl............................................. G01r 27/00
[58] Field of Search....................... 324/57 R, 57 DE

[56] References Cited
UNITED STATES PATENTS

| | | | |
|---|---|---|---|
| 2,416,310 | 2/1947 | Hansen et al. ................. | 324/57 R X |
| 2,958,729 | 11/1960 | Licklider....................... | 324/57 R X |
| 3,629,696 | 12/1971 | Bartelink..................... | 324/57 R |

Primary Examiner—Stanley T. Krawczewicz
Attorney—Karl F. Ross et al.

[57] ABSTRACT

In order to measure nonlinear phase and/or amplitude distortions in the output of a test network serving for the transmission of FM signals, such as a directive radio link, a relatively low sweep frequency $f_A$ of large amplitude $U_A$ and a relatively high test frequency $f_M$ of small amplitude $U_M$ are jointly fed into the baseband input of a frequency modulator working into or forming part of the test network. For complete exploration of the transmission band $F_0 \pm \Delta F_s$ of the network ($F_0$ being a central carrier frequency) with different values of the test frequency $f_M$, without encroaching on adjoining bands, the peak amplitude $U_A$ of the sweep voltage $u_A$ is so chosen in dependence upon the test frequency that the frequency swing $\Delta F$ due to this peak amplitude satisfies the relationship $f_M + \Delta F = \Delta F_s$. To this end, a basic voltage $u_s$ of sweep frequency $f_A$ is fed into an attenuator whose step-down ratio $k$ is electronically controlled through feedback to produce the peak amplitude $U_A$ of sweep voltage $u_A = k \cdot u_s$ according to the formula $$U_A = U_s \cdot (1 - f_M/\Delta F_s)$$

where $U_s$ is the peak amplitude of the basic voltage $u_s$. Test frequency $f_M$ may be derived, by means of a demodulator, from a source of higher frequency $f_M + f_z$ also working, at the opposite end of the test network, into a modulator receiving the demodulated network output to isolate from it a voltage of ancillary frequency $f_z$ whose amplitude and phase are then detected as a measure of the distortions to be investigated.

8 Claims, 4 Drawing Figures

SYSTEM FOR MEASURING AMPLITUDE AND PHASE DISTORTION

FIELD OF THE INVENTION

My present invention relates to a system for measuring nonlinear amplitude and/or phase distortions in the output of a test network, e.g., a directive radio link, through which signals are transmitted by frequency modulation.

BACKGROUND OF THE INVENTION

It is known, e.g., from British patent specifications No. 866,257 and No. 962,367, to measure such nonlinear distortions by frequency-modulating a carrier with a composite voltage consisting of the sum of a relatively low sweep frequency of large amplitude and a relatively high test frequency of small amplitude; the intermodulation products of these two frequencies and then retrieved from the output of the test network and can be fed to an oscilloscope in order to visualize the phase and amplitude distortions in different zones of the frequency band of interest.

The low-frequency sweep voltage $u_A = U_A \cos \omega_A$ (with $\omega_A = 2\pi f_A$) varies a carrier frequency of mean value $F_0$ to produce a sweep $\Delta F$ over a range $F_0 \pm \Delta F$. The high-frequency test voltage $u_M = U_M \cos \omega_M$ (with $\omega_M = 2\pi f_M$), whose frequency is of the order of magnitude of the sweep $\Delta F$, gives rise to a single pair of significant sideband frequencies separated from the modulated carrier by $\pm f_M$. Thus, the range of exploration extends over a band $F_0 \pm \Delta F_s$ where $$\Delta F_s = \Delta F + f_M \quad (1)$$

It is frequently desirable to vary the magnitude of test frequency $f_M$ in order to obtain different sets of intermodulation products for a more comprehensive investigation of the transmission characteristics of the network to be tested. From the aforestated relationship it will be noted, however, that such a change in test frequency alters the width of the explored range if the sweep $\Delta F$ due to voltage $f_A$ is kept constant.

OBJECTS OF THE INVENTION

The general objects of my present invention is to provide an improved system of the character described in which the spread of the explored frequency range remains unchanged with different values of the test frequency, being preferably made equal to the transmission band of the test network so as to enable an investigation of this entire band without creating interferences in adjoining bands.

A more particular object is to provide means in such a system for enabling the selection of different limits for the frequency spread.

SUMMARY OF THE INVENTION

In order to realize the aforestated objects, i.e., to maintain a constant value for $\Delta F_s = \Delta F + f_M$, the system according to my invention includes a source of basic voltage $u_s = U_s \cos \omega_A$ of sweep frequency $f_A$, this component being fed to an electronic attenuator whose step-down ratio or attenuation factor $h$ is jointly controlled by a feedback circuit and by a demodulator for the test frequency $f_M$ to establish the peak amplituide $W_A = h \cdot U_s$ of the sweep voltage at a value satisfying the relationship $$U_A = U_s (1 - f_M / \Delta F_s) \quad (2)$$

In this way, as will be shown in detail hereinafter, any change in test frequency $f_M$ is compensated by a modification of the peak amplitude $U_A$ of the sweep voltage.

In order to allow a selective variation of the range limits, i.e., of the absolute magnitude of the spread $\pm \Delta F_s$, the feedback circuit for the sweep voltage may include voltage-adjusting means such as a potentiometer ganged with a similar device for concurrently adjusting the peak amplitude $V_A$ of an input voltage $v_A = V_A \cos \omega_A$ to provide a reference voltage $r \cdot V_A$ which is differentially combined with the output voltage $V_M$ of the test-frequency demodulator, the resulting voltage difference being compared with the adjusted peak amplitude $r \cdot U_A$ of the sweep voltage $u_A$ in a differential amplifier also included in the feedback path which tends to establish equality between that voltage difference and voltage $r \cdot U_A$. Similar ganged adjustment means may be inserted in the path of the difference voltage and in a circuit deriving the basic voltage $u_s$ from the input voltage $v_A$, with maintenance of a predetermined relationship between the peak amplitude $U_s$ of this basic voltage and the frequency spread $\Delta F_s$.

The adjustable test frequency $f_M$ may be generated directly or, according to another feature of my invention, may be obtained by heterodyning with an ancillary frequency $f_z$ from a composite frequency $f_M + f_z$ which is also fed to a mixer receiving the demodulated output of the test network. The frequency spectrum appearing in the output of this mixer includes the ancillary frequency $f_z$ whose amplitude and phase are affected by the distortion encountered in the test network and can therefore be detected as a measure of that distortion.

BRIEF DESCRIPTION OF THE DRAWING

The above and other features of my invention will now be described in detail with reference to the accompanying drawing in which.

SPECIFIC DESCRIPTION

Figure 1:
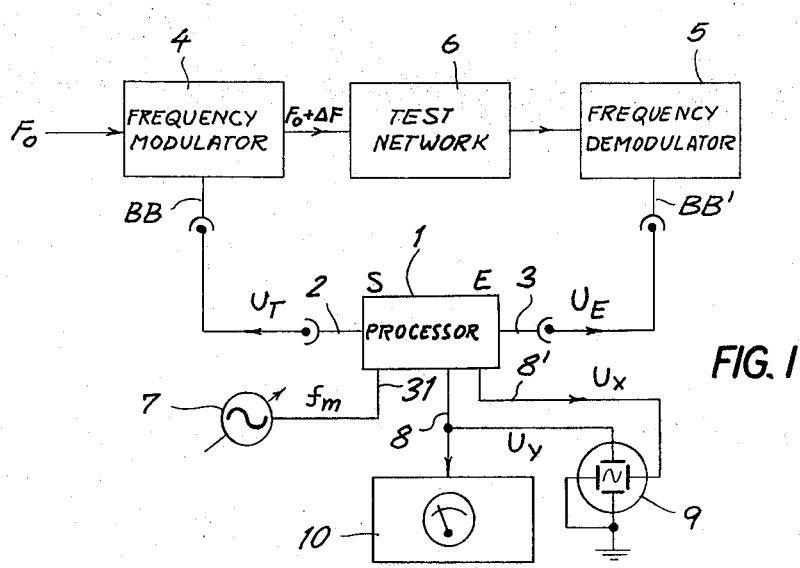
FIG. 1 is a block diagram of a distortion-measuring system embodying the invention.

In FIG. 1 I have shown a processor 1, more fully described hereinafter with reference to FIGS. 3 and 4, having a transmitting section S and a receiving section E. Transmitting section S generates, on an output terminal 2, a modulating voltage $U_T$ applied to the baseband input BB of a frequency modulator 4 also receiving a carrier frequency $F_0$ to produce a scanning oscillation of frequency $F_0 \pm \Delta F$. This oscillation traverses a test network 6 feeding a frequency demodulator 5 which generates an output voltage $U_E$ on a baseband terminal BB' thereof and supplies it to an input terminal 3 of receiving section E of processor 1. Modulator 4 and demodulator 5 may form part of the network 6 or could be separate units.

From an oscillator 7, the transmitting section S receives a variable test frequency $f_M$ supplied to an input terminal 31 of processor 1. An output terminal 8 of receiving section E carries a measuring voltage $u_y$ which is applied to the vertical-deflection electrodes of a cathode-ray-tube oscilloscope 9 whose horizontal-deflection electrodes are energized by a sweep voltage $u_x$ from an output terminal 8'. Measuring voltage $u_y$ is also applied to a conventional level indicator 10.

Figure 2:
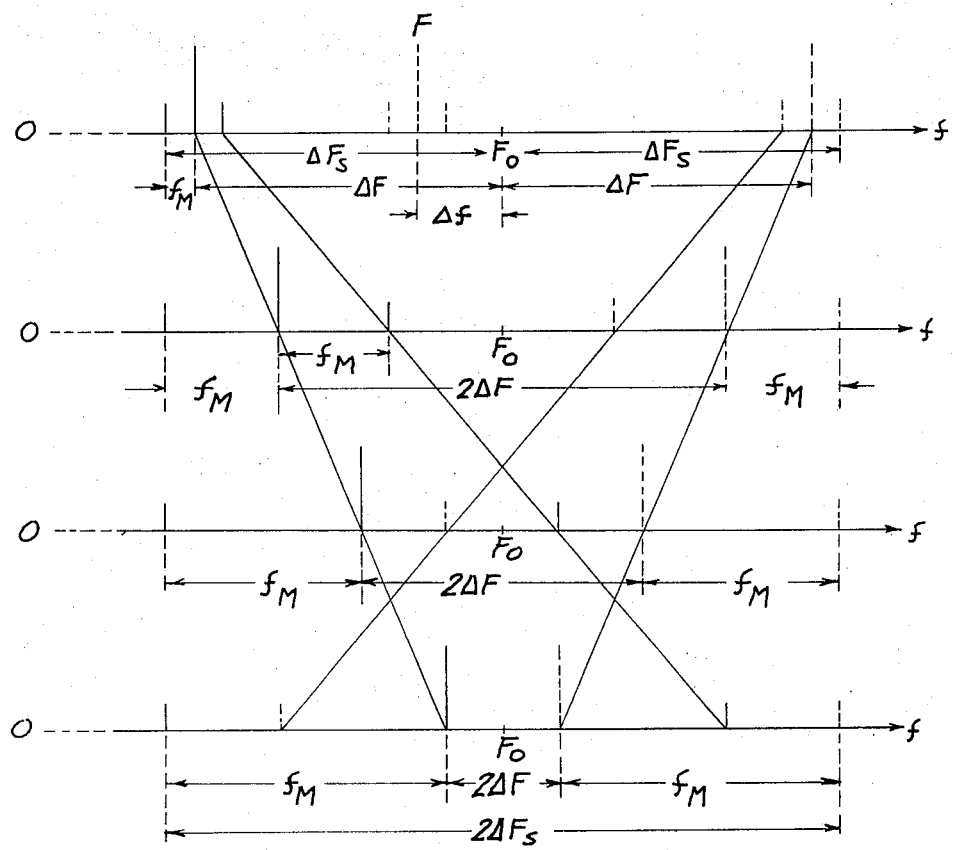
FIG. 2 is a set of graphs relating to the operation of the system of FIG. 1.

In FIG. 2 I have shown the transmission band $F_0 \pm \Delta F_s$ of the test network 6, together with four different values of test frequency $f_M$ and corresponding frequency excursions $\pm \Delta F$ of the carrier due to sweep voltage $u_A$, the magnitude of these excursions being proportional to the peak amplitude $U_A$ of that sweep voltage. For any instantaneous value $\Delta f$ of the sweep, the carrier frequency $F = F_0 \pm \Delta f$ is accompanied by a pair of first-order sideband frequencies with the separation $\pm f_M$. It will be seen that the width of the sweep $2\Delta F$ varies inversely with the test frequency $f_M$ to establish the relationship (1).

If the modulator 4 of FIG. 1 has a modulation coefficient K, we can write $$K \cdot U_A = \Delta F = \Delta F_s - f_M \tag{3}$$

and $$\Delta F_s = K \cdot U_s \tag{4}$$

where $U_s$ is the peak amplitude of a basic voltage $u_s = U_s \cos \omega_A$ generating the excursion $\pm \Delta F_s$. By eliminating K from equations (3) and (4) we obtain the expression $$U_A = U_s \cdot (1 - f_M/\Delta F_s) \tag{2}$$

Figure 3:
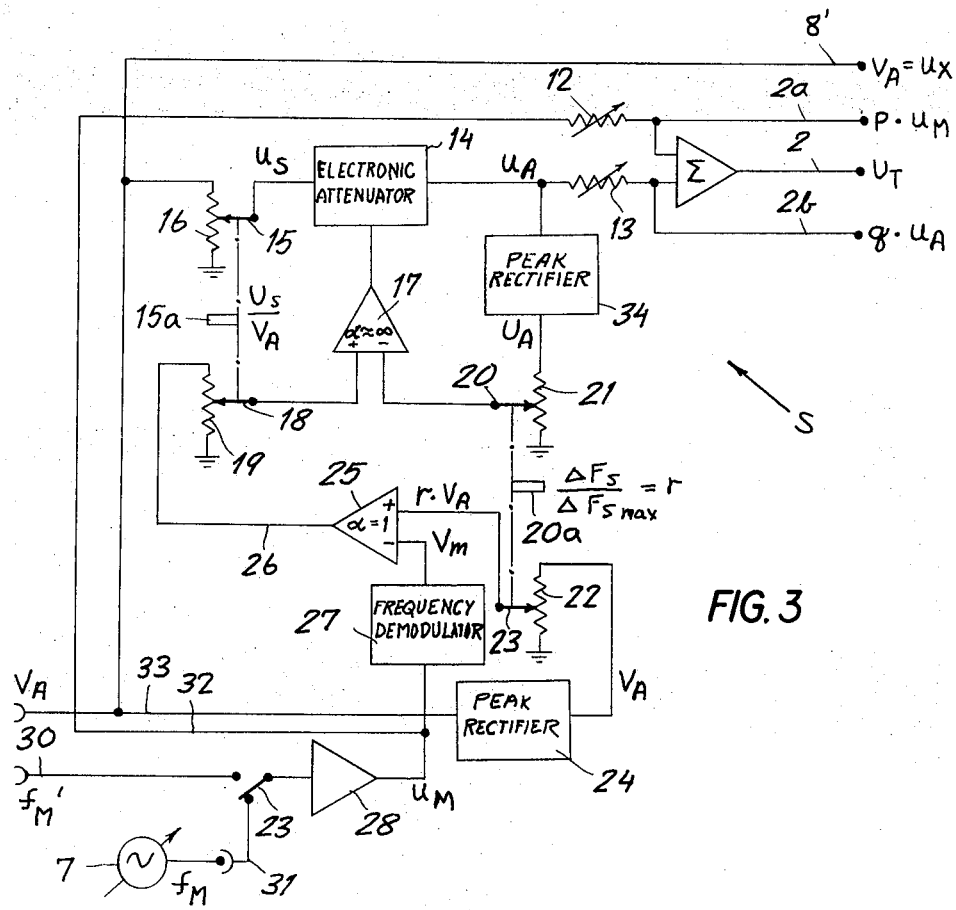
FIG. 3 is a more detailed circuit diagram of a transmitting section generating a modulating voltage in the system of FIG. 1.

FIG. 3 shows details of the transmitting section S of FIG. 1 designed to maintain the relationship (1) in accordance with formula (2). Input terminal 31, energized with test frequency $f_M$ from the adjustable oscillator 7, is connected via a switch 29 and an insulating amplifier 28 to a lead 32 feeding the test voltage $u_M$ to a frequency demodulator 27. Lead 32 also extends, through a potentiometer 12, to a summing amplifier 11 whose other input receives a sweep voltage $u_A$ from an electronic attenuator or voltage divider 14 by way of a potentiometer 13. The test voltage $u_M$ on lead 32, stepped down to a proportional value $p \cdot u_M$ by potentiometer 12, and the sweep voltage $u_A$, stepped down to a proportional value $q \cdot u_A$ by potentiometer 13, are combined in summer 11 to produce the modulating voltage $U_T$ on output terminal 2; these proportional voltages are also separately available at two terminals 2a and 2b for individual delivery to the baseband input of modulator 4 (FIG. 1), e.g., for calibration purposes. Equations (3) and (4) are based on the simplifying assumption that $q = 1$ and that amplifier 11 has a gain of unity; elements 11 and 13 may also be regarded as part of the modulator 4 so that these parameters merge with the modulation coefficient K.

Another lead 33 carries an input voltage $v_A = V_A \cos \omega_A$ of sweep frequency $f_A$ which is identical with the horizontal-deflection voltage $u_x$ applied via terminal 8' to the oscilloscope 9 of FIG. 1. A peak-riding rectifier 24, connected to lead 33, detects the amplitude $V_A$ and feeds a corresponding voltage through a potentiometer 22 to a noninverting input (+) of a differential amplifier 25 of unity gain whose inverting input (−) is energized by the output voltage $V_M$ of frequency discriminator 27 proportional to test frequency $f_M$. The output 26 of amplifier 25 thus carries a difference voltage $r \cdot V_A - V_M$ (r being the step-down ratio of potentiometer 22) which it supplies, through a further potentiometer 19 with a step-down ratio s, as a first control voltage $u_1$ to a noninverting input (+) of another differential amplifier 17 of very high gain approaching infinity. The inverting input (−) of amplifier 17 receives a second control voltage $u_2$ from a potentiometer 21 whose slider 20 is ganged with the slider 23 of potentiometer 22 and which has the same step-down ratio r, the latter being manually adjustable by means of a selector 20a. In an analogous manner, the slider 18 of potentiometer 19 is ganged with the slider 15 of a potentiometer 16, of the same step-down ratio s, which is connected to lead 33 in order to derive from input voltage $v_A$ a basic voltage $u_s = s \cdot v_A$, ratio s being manually adjustable by means of a selector 15a. Voltage $u_s$ is stepped down in attenuator 14 under the control of amplifier 17 which has an output as long as the voltages $u_1$ and $u_2$ on its noninverting and inverting inputs are different; in the steady state, therefore, $u_1 = u_2$. The attenuated voltage $u_s$ is the sweep voltage $u_A$ applied via potentiometer 13 to summing amplifier 11 and terminal 2b; a voltage representing its maximum amplitude $U_A$ is derived from it by a peak-riding rectifier 34 which feeds the potentiometer 21, thereby completing a feedback loop for attenuator 14.

Let $r = \Delta F_s/\Delta F_{smax}$, with $2\Delta F_{smax}$ representing a maximum range $2\Delta F_s$ explorable with this particular system. With $s = U_s/V_A$ and with $V_M = k \cdot f_M$ (k being the demodulation coefficient of frequency demodulator 27), selection of $k = V_A/\Delta F_{smax}$ yields $$u_1 = V_s/V_A \cdot (\Delta F_s/\Delta F_{smax} \cdot V_A - V_A/\Delta F_{smax} \cdot f_M) = U_s/\Delta F_{smax} \cdot (\Delta F_s - f_M) \tag{5}$$

and $$u_2 = U_A \cdot \Delta F_s/\Delta F_{smax} \tag{6}$$

From the equality $u_1 = u_2$ we obtain $$U_A = U_s \cdot (1 - f_M/\Delta F_s) \tag{2}$$

which, as shown above, satisfies the relationship $$\Delta F_s = \Delta F + f_M \tag{1}$$

Oscillator 7 is an external component supplementing an internal oscillation generator, not shown, whose output $f_M'$ is available on a lead 30 connectable in lieu of terminal 31 to amplifier 28 by switch 29.

Figure 4:
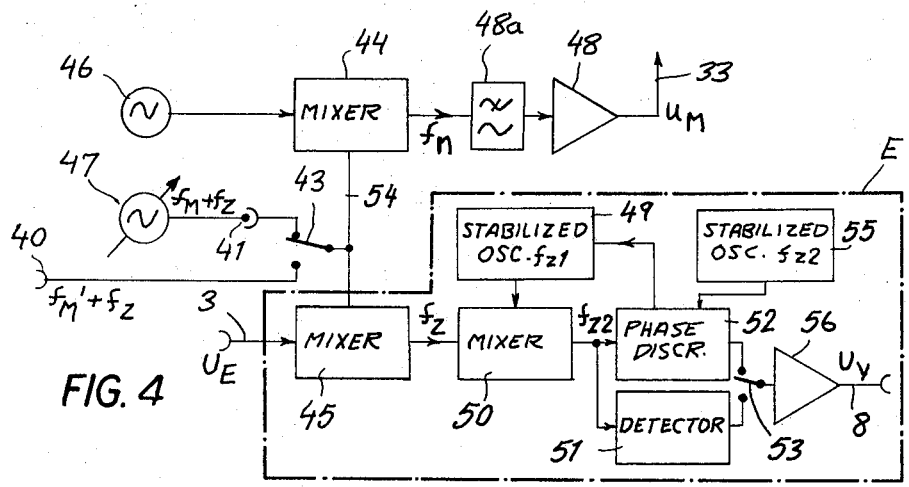
FIG. 4 is a block diagram of part of a transmission section, slightly modified with reference to FIG. 3, and an associated receiving section in the system of FIG. 1.

As shown in FIG. 4, external oscillator 7 and internal source 30 may be replaced by an oscillator 47 and a lead 40 generating a higher frequency $f_M + f_z$ and $f_M' + f_z$, respectively, $f_z$ being an ancillary frequency of predetermined magnitude substantially higher than $f_M$ (or $f_M'$). A switch 43 alternately connects the output 41 of oscillator 47 or the lead 40 to a conductor 54 feeding a pair of mixers 44, 45 in parallel. Mixer 44 receives the ancillary frequency $f_z$ from a local oscillator 46 to recover the test frequency $f_M$ (or $f_M'$) for delivery, via a low-pass filter 48a and an amplifier 48, to the lead 33 (cf. FIG. 3) as the test voltage $u_M$. Mixer 45 is connected to input terminal 3 carrying the output voltage $U_E$ of test network 6 (FIG. 1), which includes the test frequency $f_M$ as one of its components, and isolates the ancillary voltage $f_z$ therefrom. A further mixer 50, in cascade with mixer 45, receives another ancillary frequency $f_{z2} = f_z - f_{z1}$ and is supplied with a reference oscillation of like frequency $f_{z2}$ from a crystal-stabilized oscillator 55. A detector 51 is connected in parallel with phase discriminator 52 to the output of mixer 50; a switch 53 alternately feeds the phase output of discriminator 52 or the amplitude output of detector 51 to an amplifier 56 which supplies the measuring voltage $u_y$ to the vertical-deflection electrodes of oscilloscope 9 (FIG. 1) via output terminal 8.

The system of FIG. 4 is particularly useful with a processor 1 as shown in FIG. 1, incorporating both transmitting and receiving sections; when these two sections are located at separate stations, the simpler arrangement of FIG. 3 may be preferable for the transmitting station.

In a typical system of the type shown in FIG. 4, test frequency $f_M$ may range between 90 kHz and 12 MHz, with $f_z = 20$ MHz, $f_{z1} = 18$ MHz and $f_{z2} = 2$ MHz; with $f_M = 1$ MHz, for example, oscillator 47 has an output frequency of 21 MHz.

I claim:

1. In a system for measuring nonlinear distortions in a test network provided with frequency-modulating means at its input, frequency-demodulating means at its output, circuitry for supplying to said frequency-modulating means a mixture of a sweep voltage of relatively low frequency $f_A$ and a test voltage of relatively high frequency $f_M$ to explore a frequency range $F_0 \pm \Delta F_s$ with $\Delta F_s = \Delta F + f_M$, $F_0$ being the mean frequency of a carrier subject to frequency excursions $\pm \Delta F$ in response to a peak amplitude $U_A$ of said sweep voltage, and indicator means connected to said frequency-demodulating means for evaluating a measuring voltage generated by the latter, the improvement wherein said circuitry comprises:

a source of basic voltage $u_s$ of said relatively low frequency $f_A$, said basic voltage having a peak amplitude $U_s = \Delta F_s/K$ where $K$ is the modulation coefficient of said frequency-modulating means;

attenuating means connected to said source for converting said basic voltage $u_s$ into a sweep voltage $u_a$ of the same frequency $f_A$ and of peak amplitude $U_A = \Delta F/K$; and electronic control means for said attenuating means responsive to said relatively high frequency $f_M$ for maintaining said peak amplitude $U_A$ at a value satisfying the relationship $$U_A = U_s(1 - f_M/\Delta F_s)$$

with different values of $f_M$, the values of $U_s$ and $\Delta F_s$ being constant.

2. The improvement defined in claim 1 wherein said control means comprises a frequency demodulator for said relatively high frequency $f_M$ having an output voltage $V_M = k \cdot f_M$, $k$ being the demodulation coefficient of said frequency demodulator, a first differential amplifier for producing a first control voltage $u_1$ by subtracting said output voltage $V_M$ from a reference voltage, a second differential amplifier connected to receive said first control voltage $u_1$ on a noninverting input thereof, and a feedback loop supplying to an inverting output of said second differential amplifier a second control voltage $u_2$ proportional to said peak amplitude $U_A$, said second differential amplifier tending to maintain the attenuation ratio $h = U_A/U_s$ of said attenuating means at a value making said control voltages substantially equal to each other.

3. The improvement defined in claim 2 wherein said first differential amplifier has a gain of substantially unity, said second differential amplifier having a gain of nearly infinity.

4. The improvement defined in claim 2 wherein said source of basic voltage $u_s$ comprises a supply of input voltage $v_A$ of said relatively low frequency $f_A$ and first step-down means for reducing said input voltage by a predetermined ratio $s = U_s/V_A$, $V_A$ being the maximum amplitude of said input voltage $v_A$, said first differential amplitude being provided with second step-down means for reducing the difference between said reference voltage and said output voltage $V_M$ by the same ratio $s$ to produce said first input voltage $u_1$.

5. The improvement defined in claim 4, further comprising third step-down means in said feedback loop for reducing said peak amplitude $U_A$ by a predetermined ratio $r = \Delta F_s/\Delta F_{smax}$ to produce said second control voltage $u_2$, $\Delta F_{smax}$ being a predetermined maximum value for half the width of said frequency range, and fourth step-down means of the same ratio $r$ for deriving said reference voltage of magnitude $rV_A$ from said maximum amplitude $V_A$.

6. The improvement defined in claim 5, wherein said demodulation coefficient $k$ equals $V_A/\Delta F_{smax}$.

7. The improvement defined in claim 5 wherein said first and second step-down means and said third and fourth step-down means are ganged for simultaneous adjustment of their ratios $s$ and $r$, respectively.

8. The improvement defined in claim 1 wherein said circuitry includes oscillator means producing a fixed ancillary frequency $f_z$, a generator of composite frequency $f_M + f_z$, first mixer means connected to said oscillator means and said generator for recovering the frequency $f_M$ for delivery to said control means, and second mixer means connected to said oscillator means and to said frequency-demodulating means for receiving from the latter a voltage with a component of frequency $f_M$ to isolate said ancillary frequency $f_z$ for derivation of said measuring voltage therefrom.

* * * * *